Oct. 16, 1951     J. H. BUCKNAM ET AL     2,571,196
MACHINE FOR SEVERING AND SHAPING METAL PLATES
Original Filed Jan. 9, 1945     2 Sheets-Sheet 1
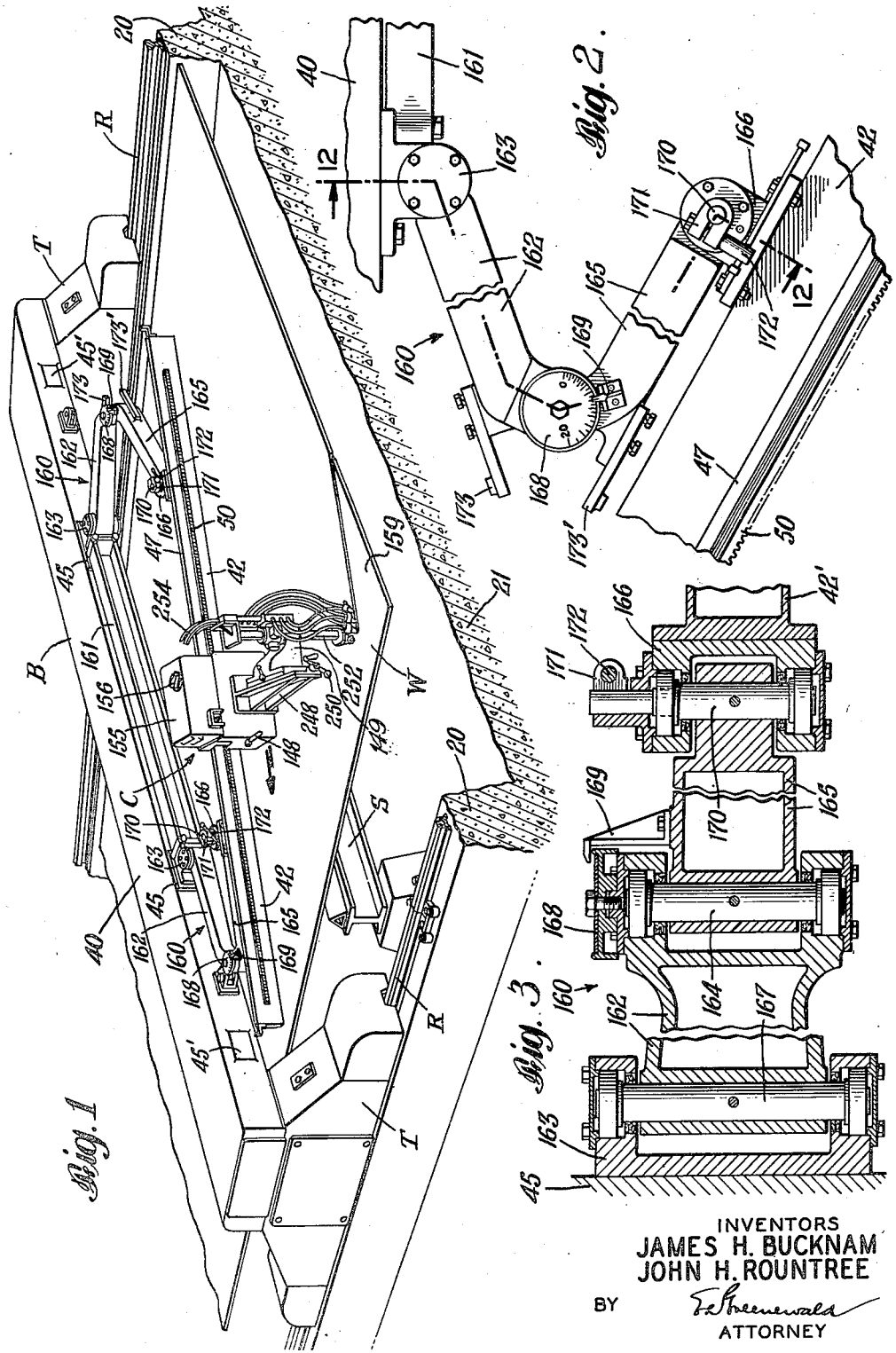
INVENTORS
JAMES H. BUCKNAM
JOHN H. ROUNTREE
BY
ATTORNEY

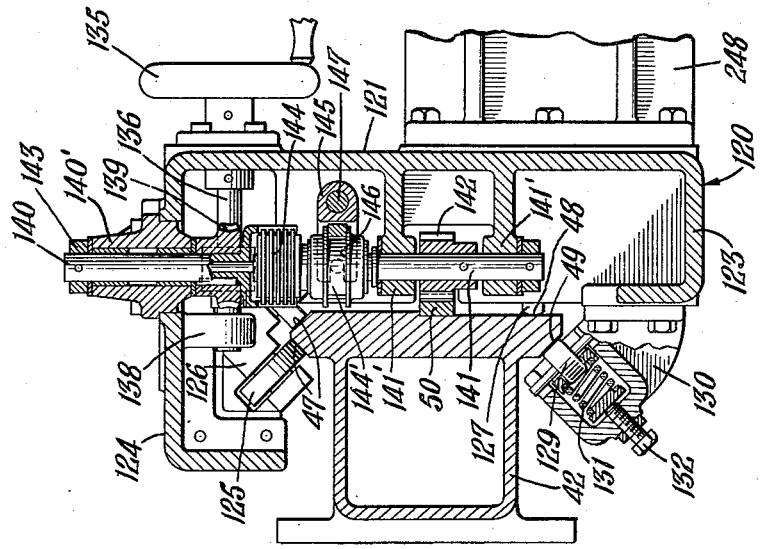
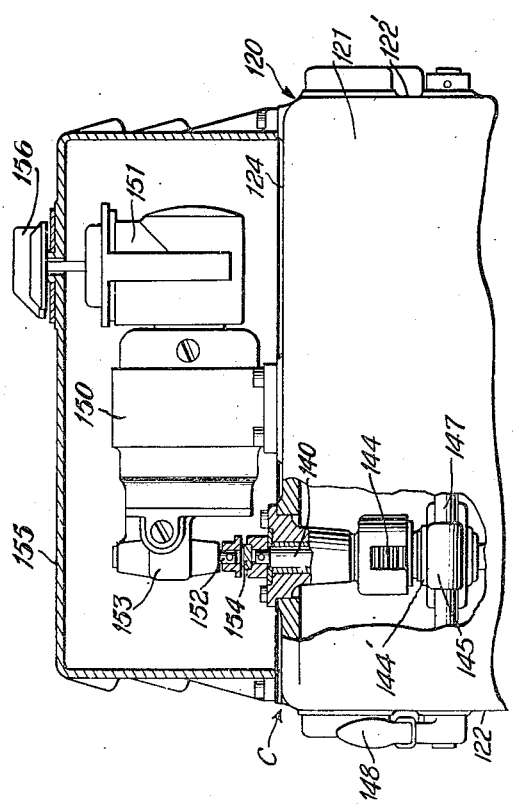
INVENTORS
JAMES H. BUCKNAM
JOHN H. ROUNTREE

Patented Oct. 16, 1951

2,571,196

UNITED STATES PATENT OFFICE 2,571,196

MACHINE FOR SEVERING AND SHAPING METAL PLATES

James H. Bucknam, Cranford, and John H. Rountree, Plainfield, N. J., assignors, by mesne assignments, to Union Carbide and Carbon Corporation, a corporation of New York Original application January 9, 1945, Serial No. 572,064. Divided and this application February, 19, 1949, Serial No. 77,354

5 Claims. (Cl. 266—231)

This application is a division of our copending parent application, Serial No. 572,064, filed January 9, 1945, now Patent No. 2,477,041, issued July 26, 1949.

This invention relates to machines for severing and shaping metal plates, and more particularly to a machine for propelling one or more blowpipes horizontally in predetermined paths so as to cut or both cut and bevel metal plates according to desired shapes and edge contours.

Shape-cutting machines or reproducing machines for moving a blowpipe in a horizontal plane in any desired direction within limits have been constructed on the principles that no resistance against movement occurs between the blowpipe and the workpiece and, as a result, the shape-cutting machines customarily used are of light construction which is satisfactory for small workpieces. If large pieces of metal, such as ship plates, are to be cut, a machine having greater cutting capacity is required, but if such a machine were constructed according to the principles of the customary shape-cutting machines, it would be impossible to maintain the cutting accuracy which is required. The handling of large plates is difficult and it is therefore desirable to perform as many of the cutting and trimming operations as possible without handling the plate between such operations.

For oxy-fuel gas or oxy-acetylene cutting of large plates such as ship plates to size, for forming desired edge contours on such plates, and for beveling the edges of such plates to prepare them for subsequent welding, there is provided according to this invention, a mechanism which is known as a "flame planer." The entire flame planer and the sub-assemblies included are of heavy duty construction and so designed as to be capable of making precision cuts even after long continued use.

The flame planer, according to the present invention, consists of at least one bridge member that extends transversely across the workpiece and is supported at each end on carriages or trucks which run on longitudinal rails at each side of the workpiece. The rails are accurately leveled and maintained straight and parallel and the workpiece is horizontally supported on a cutting bed comprising either stationary supports or a roller conveyor disposed between the rails. The flame planar includes a cutting unit mounted on the bridge member and capable of transversely severing a plate according to the length desired, of making angular cuts, and of beveling the cut edges. For transverse cutting, and for making angular cuts a self-propelled carriage cutting unit is mounted on a straight track which is carried at an adjustable angle to the bridge member.

Accordingly, the principal objects of the present invention are: to provide an improved cutting mechanism capable of accurately trimming and shaping large plates; to provide such a machine having right stability and rigidity, and which provides smooth and accurate travel of the cutting unit; to provide such a machine which can be installed in a production line; to provide such a machine which can be controlled by a single operator; and to provide a flame planer machine of the bridge type having a transverse cross track way which can be adjusted to be either parallel to the bridge or at any desired angle to the bridge.

Other objects of the invention will appear below; and while details of the embodiment disclosed by way of example are set forth, the invention is not limited to these, since changes may be made without departing from the scope of the invention as claimed.

Referring to the drawings:

Fig. 1 is a perspective view of a bridge member having secured thereto an angularly adjustable transverse track carrying a self-propelled cutting unit;

Fig. 2 is a fragmentary plan view on an enlarged scale showing the left articulated arm for adjustably supporting a track on the bridge member;

Fig. 3 is a view of a section taken along the line 12—12 of Fig. 2 to show the adjustable arm joints;

Fig. 4 is a fragmentary elevational view of the upper part of the cutting unit shown in Fig. 1 with parts broken away to illustrate the driving motor mechanism; and Fig. 5 is a vertical section through the lower part of the structure shown in Fig. 4.

Referring now particularly to Fig. 1, the large plate to be shaped and cut to size is illustrated at W. Such plate is preferably supported horizontally by suitable means such as indicated at S. The supporting means may be stationary and the plate W placed thereon by a crane or the support may comprise conveyor rollers such as are customarily used for handling large metal plates. Longitudinally along either side of the plate W are tracks or rails R mounted on suitable foundation beams 20. Such beams 20 preferably are of concrete and are joined by a substantial foundation floor 21 so that the beams 20 are rigidly connected. A bridge member B extends transversely across the plate W and is rigidly mounted at each end on trucks T arranged to run on the rails R. Supported by the bridge member B is a cutting unit C.

The bridge member B has ends rigidly secured to the upper portions of the trucks T thereby forming a bridge unit which is movable along the rails R without any deviation of the bridge member from perpendicular relation to the rails R or any variations in level.

The bridge member is preferably constructed in the form of a stiff box girder 40. Such girder 40 has means for mounting track member 42 thereon, which is provided with a longitudinal toothed rack 50.

Details of the cutting unit C are illustrated in Figs. 4 and 5. The carriage for the cutting unit C includes a box-like frame 120 which is provided with a front wall 121, left- and right-side walls 122 and 122' and bottom and top walls 123 and 124. The frame 120 is mounted for free but accurate straight line movement along the track 42. Such mounting is provided by four rollers 125 mounted in bearing brackets 126 in pairs with the axes of each pair at 90° so as to engage the angularly related upper ways 47 of the track 42. One bracket 126 is secured to the inside of the left-hand end wall 122 and another bracket 126 is secured to the inside of the right-hand end wall 122' near the upper end thereof. Two more rollers 127 are positioned to engage with the way or guiding surface 48 adjacent the lower forward edge of the track 42. A fifth roller 129 is also provided and rotatably mounted in a bracket 130 which is secured to the bottom wall 123 in a position to hold the roller 129 against the way 49 of the track 42. The roller 129 is so mounted in the bracket 130 that it is shiftable toward and away from the way surface 49 and is urged against the way 49 by a spring 131, the tension of which may be adjusted by a screw 132. Such arrangement of rollers provides accurate and smooth movement of the frame 120 along the track 42.

The movement of the frame 120 may be accomplished in either of two ways. In one of such ways, the frame 120 is shifted by rotation of a handwheel 135 which is mounted on the end of a forwardly extending shaft 136. The shaft 136 passes through the front wall 121 and carries a worm (not shown). The inner end of the shaft 136 is carried in a bearing 138. The worm engages a worm gear 139 which is keyed to a vertical drive shaft 140 that is mounted in a bearing 140' extending through the top wall 124. Axially in line with and below shaft 140 is a shaft 141 supported in bearings 141' extending inwardly from the front wall 121. Between the bearings 141', a pinion 142 is secured to shaft 141 in a position to engage with the rack 50 of the track 42. The portion of shaft 140 that extends upwardly through the bearing 140' has a collar 143 secured to its upper end. The shaft 141 also has thereon a clutch 144 that is positioned between the upper one of the bearings 141' and the worm gear 139 on shaft 140 and has a member 144' vertically shiftable by a fork 145, the ends of which engage a groove 146 in the clutch member 144'. The fork 145 is secured to a horizontal cross shaft 147 which passes rotatably through the end wall 122 and has secured to its external end a shifting lever 148. When the lever 148 is raised, the clutch is disengaged so that the lower shaft 141 will be free to rotate independently of the upper shaft 140 and thus the frame 120 can be shifted rapidly along the track 42 without rotating the handwheel 135 or the upper end of the shaft 140 which can be coupled to a motor.

The other manner of moving the frame 120 along the track 42 is by a motor 150 as shown in Fig. 4. The motor 150 has a governor type of speed control mechanism 151 of the type customarily employed in shape-cutting machines or self-propelled blowpipe carriages and at the opposite end, an output shaft 152 that extends downwardly from a housing 153 containing gearing coupling the output shaft 152 with the standard motor shaft. The shaft 152 is connected by coupling means 154 in axial alignment with the upper portion of the vertical drive shaft 140. The motor 150 is secured to the top 124 of the frame 120 and is preferably covered by a housing 155. A speed control indicator and dial 156 is preferably mounted on top of the housing 155 above the governor 151. The pinion on the shaft 140 which meshes with the rack 50, the electrical connections from a source of power for the motor and a control switch are not shown in the interest of clearness of the drawing.

For supporting the cutting blowpipe mechanism, on carriage C there is preferably secured to the front wall 121, a forwardly extending slide-way 248 along which a slider 149 is movable. The slider 149 is positionable along the slide-way 248 by a crank handle 250 which turns a screw threadedly engageable with the slider in the usual manner. The slider 149 carries a torch-supporting mechanism of any desired type which however is preferably a plate-riding device 252 of the type disclosed and claimed in the U. S. Patent No. 2,373,541 issued April 10, 1945, to R. Chelborg and H. Pufahl. Such plate-riding device carries a cluster of cutting blowpipe nozzles at an accurate elevation from the surface of the plate being cut, the nozzles also held in such relation to each other that the desired trimming and beveling operations may be simultaneously carried out during movement of the plate-rider device on the surface of the work. The nozzle cluster may be similar to that disclosed in the aforementioned U. S. patent.

Gases such as fuel gas, heating oxygen, and cutting oxygen are supplied to the blowpipe nozzles by flexible hose connections 254 which in turn are coupled to control valves in the customary manner.

Mechanism is provided for mounting the transverse track member at any desired angular relation to the bridge member B. The track 42 is shown positioned to cut off a corner 159 of a plate W. The track 42 is supported by two jointed arms 160 which are identical but opposite handed wherefore the left arm only is described in detail. A channel-like frame member 161 is secured along the sides of the girder 40 preferably on mounting pads 45 under each end of the member 161. One link 162 of the arm 160 is pivotally supported at its inner end by a bearing 163 at the left end of the member 161. The front end of the link 162 is pivotally connected by an axially vertical pivot pin 164 to the rear end of a forward link 165 and the remaining end of the forward link 165 is pivotally connected to a bearing 166 secured to the rear of the track member 42.

In Fig. 3 it will be seen that the link 162 has secured thereto a pivot pin 167, the ends of which are rotatably mounted in the bearing bracket 163. The pivot pin 164 is secured to the link 165, and its ends are rotatably mounted in a fork of the link 162. The upper part of the fork of the link 162 carries a dial 168 which has marks thereon cooperating with an index 169 mounted on the link 165. The dial and index permits settings of the track 42 to be made according to a schedule of numbers. A pivot pin 170 secured to the link 165 is rotatably carried in the bearing bracket 166 which is provided with a locking clamp 171 of the split type having a clamping screw 172. By tightening the clamping screw the track 42 may be locked in position. Stops 173 and 173' are also provided at the elbow ends of the links 162 and 165. These stops are arranged to pass each other when the arm 160 is fully extended but are provided so that the stop 173 will engage a pad 45' on the bridge girder 40 when the link 162 is in its fully retracted position and the stop 173' will engage the back of the track 42 when the link 165 is at its closest position to the track.

The operation of the embodiment described herein is believed evident from the above description. If it is desired to transversely sever a plate to cut the plate into lengths or to trim the ends square, the plate will be moved by conveyor rollers or by a crane in position upon the supports S. The carriage C on the track 42 of the bridge member B can be used. The arms 160 will be adjusted to their fully retracted position and locked in that position so that the track 42 will be held parallel to the bridge girder 40. The cutting unit C is then operated in the customary manner to sever the plate. For example, the cut may be started at one edge of the plate by heating a spot on the plate to ignition temperature. The cutting oxygen stream or streams of the nozzles which are supported by the plate-riding device 252 is turned on and the motor 150 in the carriage C is energized to propel the carriage along the track 42 at a cutting speed. The nozzles are accurately positioned by use of the crank handle 250 and the plate-riding device 252 will maintain the nozzles at the correct level above the work surface. The cutting speed is preselected by adjusting the setting of the governor control 156.

If angular transverse cuts are to be made, the jointed arms 160 are adjusted into positions which will hold the track 42 at the desired angular relation to the bridge beam 40, for example as illustrated in Fig. 1. With such arrangement the self-propelled carriage C is employed to move the plate-riding attachment 252 and nozzles thereon in the desired angular path on the work surface.

While there has been described what is at present considered to be the preferred embodiment of this invention, it will be obvious to those skilled in the art that various changes and modifications may be made therein without departing from the invention, and it is therefore intended in the appended claims to cover all such changes and modifications as fall within the true spirit and scope of the invention.

We claim:

1. A blowpipe machine comprising a transverse bridge member; trucks under each end of said bridge member and secured thereto, spaced parallel rails on which said trucks run to provide longitudinal horizontal movement of said bridge member; a track secured to one side of said bridge member; adjustable means for supporting said track on said bridge member at selected distances therefrom and at selected angles thereto; a blowpipe supporting carriage unit mounted on and movable along said track; a rotatable drive member in driving engagement with said track; a shaft mounted in said blowpipe supporting carriage for operating said drive member; and means for operating said shaft to move said blowpipe unit along said angularly disposed track.

2. In a blowpipe machine, a transverse bridge member supported at each end on trucks which are longitudinally movable along parallel rails, a track member secured to said bridge member, a blowpipe carrying unit supported on said track for movement therealong, a pair of arms formed by pivoted links, each arm having one link pivoted to said track member and a link pivoted to said transverse bridge member; said links being movable horizontally only, and means for locking the pivots of each arm against movement.

3. A blowpipe machine comprising a transverse bridge member; wheeled trucks under each end of said bridge member and secured thereto; spaced parallel rails along which said trucks run longitudinally thereof; a track supported on said bridge member; a blowpipe supporting unit mounted on and movable along said track; a rotatable drive member in driving engagement with said track; and adjustable means for supporting said track on said bridge member at selected angularly disposed positions with respect thereto.

4. A blowpipe machine according to claim 1, in which said adjustable supporting means comprises at least one arm formed by pivoted links, said arm having one link pivoted to said track member and a link pivoted to said carriage, said links being movable horizontally only.

5. A blowpipe machine according to claim 1, in which said adjustable supporting means comprises at least one arm formed by pivoted links, said arm having one link pivoted to said track member and a link pivoted to said carriage, said links being movable horizontally only; and means associated with at least one of the pivots of said arm for locking the pivot against movement.

JAMES H. BUCKNAM.
JOHN H. ROUNTREE.

REFERENCES CITED

The following references are of record in the file of this patent:

UNITED STATES PATENTS

| Number | Name | Date |
| --- | --- | --- |
| 366,811 | Bolgiano | July 19, 1887 |
| 627,435 | Minthorn | June 20, 1899 |
| 1,176,584 | Madgett | Mar. 21, 1916 |
| 1,777,497 | Krebs | Oct. 7, 1930 |
| 1,811,835 | Anderson | June 30, 1931 |
| 1,825,606 | Schmidt | Sept. 29, 1931 |
| 1,999,787 | Sassen | Apr. 30, 1935 |
| 2,032,733 | Anderson | Mar. 3, 1936 |
| 2,231,014 | Lytle et al. | Feb. 11, 1941 |
| 2,233,098 | Hodnett | Feb. 25, 1941 |
| 2,259,956 | Jones | Oct. 21, 1941 |
| 2,327,255 | Flygare et al. | Aug. 17, 1943 |
| 2,391,008 | Bucko | Dec. 18, 1945 |

FOREIGN PATENTS

| Number | Country | Date |
| --- | --- | --- |
| 626,443 | France | May 9, 1927 |
| 553,540 | Germany | June 27, 1932 |

OTHER REFERENCES

Trinks: "Industrial Furnaces," 3rd Ed., 4th printing, Jan. 1944, vol. 1, pages 289–293, pub. by John Wiley & Sons, Inc.. New York.